United States Patent [19]

Kataoka

[11] Patent Number: 4,483,296

[45] Date of Patent: Nov. 20, 1984

[54] SYSTEM FOR CONTROLLING AN AIR-FUEL RATIO

[75] Inventor: Ryuji Kataoka, Tokyo, Japan

[73] Assignees: Fuji Jukogyo Kabushiki Kaisha, Tokyo; Nissan Motor Company, Limited, Yokohama, both of Japan

[21] Appl. No.: 417,969

[22] Filed: Sep. 14, 1982

Related U.S. Application Data

[62] Division of Ser. No. 174,372, Aug. 1, 1980, Pat. No. 4,393,839.

[30] Foreign Application Priority Data

Aug. 2, 1979 [JP] Japan .................................. 54-98919

[51] Int. Cl.³ ............................................. F02M 7/12
[52] U.S. Cl. .................................................. 123/440
[58] Field of Search ....................... 123/493, 440, 489; 60/276, 285

[56] References Cited

U.S. PATENT DOCUMENTS

| | | | |
|---|---|---|---|
| 3,916,170 | 10/1975 | Norimatsu et al. | 123/493 |
| 4,057,042 | 11/1977 | Aono | 123/440 |
| 4,089,313 | 5/1978 | Asano et al. | 123/493 |
| 4,119,072 | 10/1978 | Asano | 123/440 |
| 4,132,199 | 1/1979 | Kuroiwa et al. | 60/276 |
| 4,143,623 | 3/1979 | Norimatsu et al. | 123/489 |
| 4,192,268 | 3/1980 | Hattori et al. | 60/276 |

*Primary Examiner*—Andrew M. Dolinar
*Attorney, Agent, or Firm*—Martin A. Farber

[57] ABSTRACT

A method and system for controlling the air-fuel ratio for a carburetor for an internal combustion engine having an intake passage, an exhaust passage, a throttle valve, a detector for detecting the concentration of a constituent of the exhaust gases, an on-off type electromagnetic valve for correcting the air-fuel ratio of the air-fuel mixture supplied by an air-fuel mixture supplier and an electronic controller. The electronic controller comprises a comparing circuit for comparing the output signal of the detector with a stoichiometric reference signal, for driving the on-off electromagnetic valve for controlling the air-fuel ratio to a value approximating the stoichiometric air-fuel ratio. A switch connects a constant signal generating circuit to the electronic controller and renders the electronic control means non-responsive to the detector when a vacuum sensor actuates the switch during a rapid deceleration, whereby the on-off electromagnetic valve operates by the constant signal from the constant signal generating circuit at a predetermined duty ratio to prevent an excessive enrichment of the mixture caused by misfiring.

5 Claims, 2 Drawing Figures

SYSTEM FOR CONTROLLING AN AIR-FUEL RATIO

This is a division of application Ser. No. 174,372, filed Aug. 1, 1980, now U.S. Pat. No. 4,393,839.

BACKGROUND OF THE INVENTION

The present invention relates to a method and system for controlling the air-fuel ratio for an internal combustion engine emission control system with a three-way catalyst, and more particularly to a system for controlling the air-fuel ratio to a predetermined value so as to effectively operate the three-way catalyst during such a deceleration which causes misfiring for preventing deviation of the air-fuel ratio caused by the misfiring.

Such a known system is a feedback control system, in which an oxygen sensor is provided to sense the oxygen content of the exhaust gases to generate an electrical signal as an indication of the air-fuel ratio of the burned air-fuel mixture. The control system controls the air-fuel ratio of the mixture to be fed to the engine in dependency on the signal from the oxygen sensor. However, if misfiring occurs in the engine during deceleration of the vehicle, a large amount of oxygen remains in the exhaust gas. The oxygen content of the exhaust gas then approximates that of exhaust gas which is produced when a lean mixture is induced and burned in the engine. Accordingly, the oxygen sensor generates a signal like a lean mixture detection, so that the control system operates to vary the mixture to a rich air-fuel ratio. Therefore, even if the actually induced mixture is a rich or proper air-fuel ratio, the mixture is excessively enriched by the control of the system. Thus, the fuel consumption of the engine deteriorates and unburned constituents of the exhaust gases increase.

SUMMARY OF THE INVENTION

The object of the present invention is to provide a system for controlling the air-fuel ratio in which a feedback control system becomes non-responsive to the signal from the oxygen sensor upon detection of such a deceleration which causes misfiring and operates to control the air-fuel ratio to a predetermined constant value for thereby preventing an excessive rich mixture supply.

According to the present invention, there is provided in a method and system for controlling air-fuel ratio for a carburetor of an internal combustion engine having an intake passage, a throttle valve, an exhaust passage, detecting means for detecting the concentration of a constituent of the exhaust gases passing through said exhaust passage and providing a detected output signal dependent thereon, air-fuel mixture supply means, and an on-off type electromagnetic valve for correcting the air-fuel ratio of the air-fuel mixture supplied by said air-fuel mixture supply means, the improvement comprising electronic control means comprising a judgement circuit means for comparing the detected output signal of said detecting means with a reference value corresponding to a stoichiometric air-fuel ratio value and for producing a first output signal dependent on the difference, and a driving circuit means for producing a driving output for driving said electromagnetic valve means dependent on the first output signal of said comparing circuit means for controlling the air-fuel ratio to a value approximately equal to the stoichiometric air-fuel ratio, constant signal generating circuit means for selectively operating said on-off electromagnetic valve at a predetermined duty ratio, an integration circuit connected between the comparing circuit and an input of the driving circuit means, a coefficient circuit connected in parallel to the integration circuit through a first switch, a second switch for connecting the output of the constant signal generating circuit to an input of the integration circuit, a third switch for disabling the integration operation of the integration circuit, means comprising a vacuum switch in the induction passage for sensing only such a high vacuum occurring in a rapid deceleration condition of the engine that would cause misfiring and for simultaneously producing a second output signal and a switch actuating circuit for actuating the switches, the second output signal being so arranged to open the first switch and to close the second and third switches, whereby the driving circuit means is operated by the constant signal from said constant signal generating circuit means for driving the electromagnetic valve at the predetermined duty ratio.

Other objects and features of the present invention will become apparent from the following description of a preferred embodiment with reference to the accompanying drawings.

DETAILED DESCRIPTION OF THE PREFERRED EMBODIMENT

Figure 1:
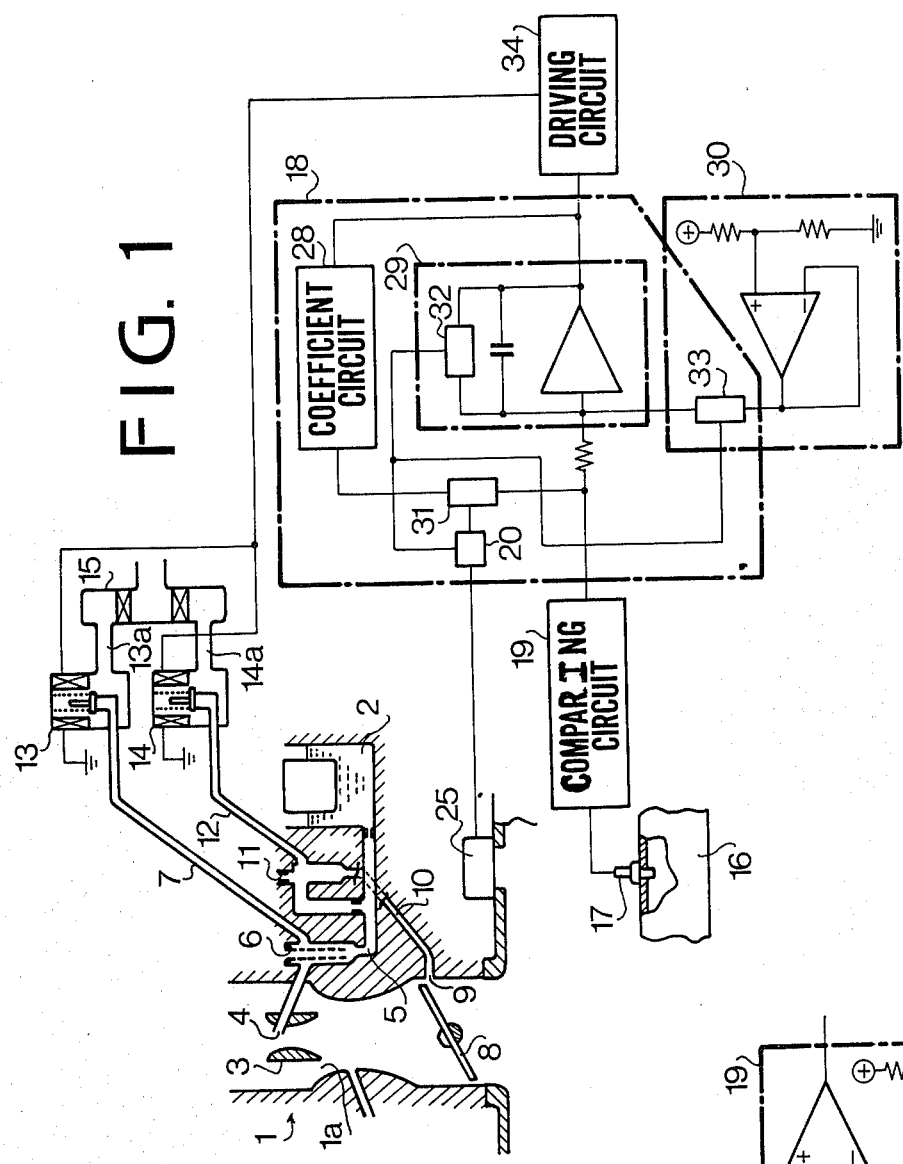
FIG. 1 is a schematic view, partially in section and partially broken away, of a system for controlling air-fuel ratio partly according to the present invention.
Figure 2:
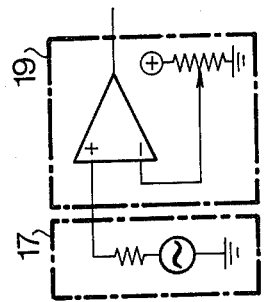
FIG. 2 is a schematic view showing a sensor circuit of FIG. 1.

Referring to FIGS. 1 and 2, a carburetor 1 communicates with an internal combustion engine (not shown). The carburetor comprises a float chamber 2, a venturi 3 formed in an intake passage 1a, a nozzle 4 communicating with the float chamber 2 through a main fuel passage 5, and a slow port 9 provided near the throttle valve 8 in the intake passage 1a and communicating with the float chamber 2 through a slow fuel passage 10. Air correcting passages 7 and 12 are provided in parallel to a main air bleed 6 and a slow air bleed 11, respectively. On-off type electromagnetic valves 13 and 14 are provided for the air correcting passages 7 and 12 respectively. Inlet port 13a and 14a of each on-off electromagnetic valve communicates with atmosphere through an air cleaner 15. An oxygen sensor 17 is disposed in an exhaust pipe 16 which communicates with the exhaust port(s) of the engine for detecting the oxygen content of the exhaust gases therein. A three-way catalytic converter (not shown) is provided in the exhaust pipe 16 downstream of the oxygen sensor 17.

The output signal of the oxygen sensor 17 is sent to a comparing circuit 19 of an electronic control circuit 18. The comparing circuit 19 compares the input signal from the oxygen sensor with a reference voltage $V_R$ (FIG. 3) corresponding to the stoichiometric air-fuel ratio and by this comparison determines whether the input signal is rich or lean compared with the voltage $V_R$ to produce a comparison signal. The comparison signal is sent to an integration circuit 21, where the signal is converted to an integration signal which varies in an opposite direction to the direction represented by the comparison signal. The integration signal is fed to a comparator circuit 22 via a switch 35. The comparator 22 compares the integration signal with triangular wave pulses applied from a triangular wave pulse generator 23 to produce square wave pulses. The square wave pulses are fed to the on-off type electromagnetic valves 13 and 14 through a driving circuit 24.

When a rich air-fuel ratio is determined in the comparing circuit 19, the driving circuit 34 produces output pulses having a greater pulse duty ratio whereby the electromagnetic valves 13 and 14 open for longer times during each pulse and the amount of air passing through the on-off electromagnetic valves 13 and 14 increases. Thus, the amount of air in the mixture fed from the carburetor 1 increases to thereby increase the air-fuel ratio. When a lean air-fuel ratio is determined via comparing circuit 19, an output signal having a smaller pulse duty ratio is produced whereby the air-fuel ratio is decreased to enrich the mixture.

In accordance with the present invention, a vacuum switch 25 is provided in an intake passage 26 to the engine for detecting the high vacuum which occurs in the rapid deceleration condition that can cause misfiring.

The system includes a coefficient circuit 28 and an integration circuit 29 which are connected in parallel with each other via a switch 31 (the coefficient circuit 28 also being considered as part of the integration circuit 29 as a proportional and integrating circuit), and a fixed duty ratio signal voltage generating circuit 30 connected to an input of the integration circuit 29 through a switch 33. The system further includes the switch 31 for connecting the coefficient circuit 28, a switch 32 of the integration circuit connected in parallel to a capacitor of the integration circuit for disabling the integration operation of the integration circuit 29, and the switch 33 for connecting the fixed duty ratio signal voltage generating circuit 30. Each switch is actuated by the output signal of the switch actuating circuit 20 of FIG. 1, the circuit 20 producing outputs dependent on the output of the vacuum switch 25.

In the usual operation, the switch 31 is closed and switches 32 and 33 are opened. In such case the comparison signal from the comparison circuit 19 is converted to a proportional and integration signal by the coefficient circuit 28 and integration circuit 29.

The signal is fed to the on-off electromagnetic valves 13 and 14 through a driving circuit 34 for controlling the air-fuel ratio. The driving circuit 34 includes a square pulse generating circuit to produce square wave pulses in dependency on the output of the integration circuit 29. When the vacuum switch 25 is closed, the switch 31 is opened and switches 32 and 33 are closed. Therefore the integration circuit is short-circuited by switch 32 and the coefficient circuit 28 is cut out and the circuit 30 is switched in. Thus, the fixed duty ratio signal from the circuit 30 is fed to the electromagnetic valves 13 and 14 through the circuit 29 and driving circuit 34. Thus, the electromagnetic valves operates at a predetermined duty ratio.

In accordance with the present invention, since the feedback control is ineffective in a rapid deceleration condition which would cause misfiring to occur, it is possible to prevent a supply of an excessively enriched air-fuel mixture caused by the detecting signal of the oxygen sensor. Thus, the three-way catalytic converter may effectively operate to reduce the harmful constituents of the exhaust gases and fuel consumption can be improved.

What is claimed is:

1. In a system for controlling the air-fuel ratio for a carburetor of an internal combustion engine having an induction passage, a throttle valve in said induction passage, an exhaust passage, detecting means for detecting the concentration of a constituent of exhaust gases passing through said exhaust passage and providing a detecting output signal dependent thereon, air-fuel mixture supply means for supplying the air-fuel mixture to the induction passage, including an on-off type electromagnetic valve for correcting the air-fuel ratio of the air-fuel mixture supplied by said air-fuel mixture supply means, the improvement comprising electronic control means comprising a comparing circuit means for comparing the detecting output signal of said detecting means with a reference value corresponding to a stoichiometric air-fuel ratio value and for producing a first output signal dependent on the difference, a driving circuit means for producing a driving output for driving said on-off type electromagnetic valve dependent on the first output signal of said comparing circuit means for controlling the air-fuel ratio to a valve approximately equal to the stoichiometric air-fuel ratio when said electronic control means is operatively responsive, a constant signal generating circuit means for producing a constant signal selectively operating said on-off type electromagnetic valve at a predetermined duty ratio via said driving circuit means, switch means when actuated for making said electronic control means operatively non-responsive and simultaneously for operatively connecting said constant signal generating circuit means to said driving circuit means, means comprising a vacuum switch in said induction passage for sensing only such a high vacuum occurring in a rapid deceleration condition of said engine that would cause misfiring and for simultaneously producing a second output signal for actuating said switch means whereby said driving circuit means is operated by the constant signal from said constant signal generating circuit means for driving said electromagnetic valve at said predetermined duty ratio, said switch means includes, a first switch having inputs operatively connected to said comparing circuit means and to an output of said vacuum switch, a second switch having inputs operatively connected to outputs of said vacuum switch and said constant signal generating circuit means, and said first and second switches each having an output connected operatively to an input of said driving circuit means, said system further comprising an integration circuit connected between said comparing circuit and an input of said driving circuit means, and a coefficient circuit connected in parallel to said integration circuit, said switch means includes a third switch, said integration circuit includes a capacitor connected across said first switch, said third switch is connected between said comparing circuit and said coefficient circuit in series with the latter, and said means comprising a vacuum switch includes a switch actuating circuit for closing said first and second switches and simultaneously opening said third switch when said vacuum switch detects said high vacuum occurring in said rapid deceleration condition, at other times said third switch being closed and said first and second switches being open.

2. In a system for controlling the air-fuel ratio for a carburetor of an internal combustion engine having an induction passage, a throttle valve in said induction passage, an exhaust passage, detecting means for detecting the concentration of a constituent of exhaust gases passing through said exhaust passage and providing a detecting output signal dependent thereon, air-fuel mixture supply means for supplying the air-fuel mixture to the induction passage, including an on-off type electromagnetic valve for correcting the air-fuel ratio of the air-fuel mixture supplied by said air-fuel mixture supply means, the improvement comprising electronic control means comprising a comparing circuit means for comparing the detecting output signal of said detecting means with a reference value corresponding to a stoichiometric air-fuel ratio value and for producing a first output signal dependent on the difference, a driving circuit means for producing a driving output for driving said on-off type electromagnetic valve dependent on the first output signal of said comparing circuit means for controlling the air-fuel ratio to a value approximately equal to the stoichiometric air-fuel ratio when said electronic control means is operatively responsive, a constant signal generating circuit means for producing a constant signal selectively operating said on-off type electromagnetic valve at a predetermined duty ratio via said driving circuit means, an integration circuit connected between said comparing circuit and an input of said driving circuit means, a first switch, a coefficient circuit connected in parallel to said integration circuit through said first switch, a second switch for connecting the output of said constant signal generating circuit to an input of the integration circuit, a third switch for disabling the integration operation of said integration circuit, means comprising a vacuum switch in the induction passage for sensing only such a high vacuum occurring in a rapid deceleration condition of the engine that would cause misfiring and for simultaneously producing a second output signal and a switch actuating circuit for actuating the switches, the second output signal being so arranged to open the first switch and to close the second and third switches, whereby the driving circuit means is operated by the constant signal from said constant signal generating circuit means for driving the electromagnetic valve at the predetermined duty ratio.

3. The system as set forth in claim 2, wherein said vacuum switch closes when said high vacuum occurring in said rapid deceleration condition of said engine occurs.

4. The system as set forth in claim 2, wherein said vacuum switch is disposed downstream of said throttle valve.

5. The system as set forth in claim 2, further comprising a catalytic converter disposed in the exhaust passage downstream of said detecting means.

* * * * *